July 29, 1958 J. NAGLER ET AL 2,844,990
METHOD AND APPARATUS FOR PRODUCING COLOR
EFFECTS IN PROJECTED PICTURES
Filed Nov. 9, 1954 2 Sheets-Sheet 1

United States Patent Office
2,844,990
Patented July 29, 1958

2,844,990

METHOD AND APPARATUS FOR PRODUCING COLOR EFFECTS IN PROJECTED PICTURES

Josef Nagler and Josef Nagler, Jr., Vienna, Austria

Application November 9, 1954, Serial No. 467,862
Claims priority, application Austria November 11, 1953
16 Claims. (Cl. 88—16.4)

The invention relates to methods of and apparatus for producing television pictures.

By the use of light and dark contrasts (especially black and white contrasts) pictures can be made to appear subjectively coloured. This surprising phenomenon was first investigated by Fechner and Benham who found that rotating discs, which are divided into black and white sectors and which have a number of black arcs at different radii in the white part, do not appear grey. These discs always give an impression of colour in the radial parts of the black arcs of the white sectors when rotating fairly slowly and not an impression of grey by fusion of black and white. The tone subjectively perceived depends on the angular proportions of the black and white sectors and on the position and length of the arcs in the white sectors (see F. W. Bagley "An investigation of Fechner's colors" in Zeitschrift für Psychologie, volume 33, pages 130–131; Fr. Korman "Die Erzeugung eines kontinuierlichen Spektrum auf Grund der Benham'schen Farben" ibid, volume 62, pages 158–166; and H. Pieron "Le mechanisme d'apparition des couleurs subjectives de Fechner-Benham," L'annee psychologique, volume 23, pages 1–49). We are not aware of any previous technical application of this phenomenon.

In order to explain the invention reference will be made to the accompanying drawings, in which.

The following discussion is in connection with discs in order to explain the operation of the well-known Fechner-Benham effect. The circular discs shown in Figures 1 to 3, which may be considered as being rotated manually or by a motor, are divided into seven equal sectors. The disc in Figure 1, considered in a counter-clockwise direction, consists of three adjacent black sectors, one sector of arcs concentric with the centre of the disc and of three adjacent white sectors. When the disc is very slowly rotated in the direction as shown by the upper arrow, i. e. clockwise, on looking through a sector "A" which is fixed in space, the part of the disc which is seen appears black for 3/7 of a revolution then shaded for 1/7 and finally white during the last 3/7 of the revolution. On rotating the disc however at 3 to 10 revolutions per sec., preferably at 7 or 8, the sector "A" however is not perceived as grey but gives the impression of being red, although there are objectively only the physiological colours of black and white. Provided the speed of rotation is relatively low so that the moving sectors can be just followed up by the eyes, then the impression of red colour is substantially indicated on the arcs of the white coloured sectors. An increase of speed makes the whole disc look red. Further increase of the rotational speed makes the disc almost grey.

Figure 2:
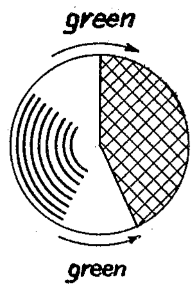

The disc in Figure 2 has three black sectors, one white, another two of concentric arcs and lastly one white sector (going around the disc in a clockwise direction). On rotating this disc at 3 to 10 revolutions per sec. the disc gives the impression of green colour.

Figure 1:
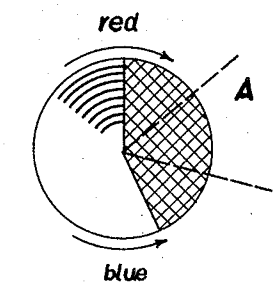
Figures 1 to 6 show model discs which have been prepared to explain the principle applied in the present invention.
Figure 3:
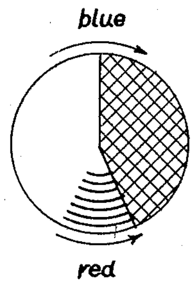
Figure 4:
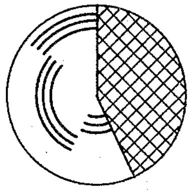
Figure 5:
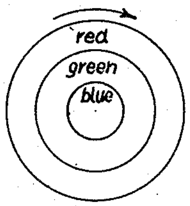
Figure 6:
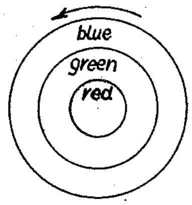

The disc shown in Figure 3 is similar to the one in Figure 1 but with the reversed order in the sectors. Considered in a counter-clockwise direction, three black sectors are followed by three white and one shaded. If rotated at 3 to 10 revolutions per sec. in a clockwise direction the disc gives an impression of blue colour. Rotating in the opposite direction would give the impression of red colour, because the black, white and shaded parts would then have a similar relation as on the disc of Figure 1. The disc shown in Figure 2 is symmetrical about one diameter and hence one gets an impression of green in both directions of rotation. Figure 4 shows a disc combining the patterns of the three discs of Figures 1 to 3 into one. In the outer one third part of the disc of Figure 4, three black sectors are followed by three white sectors and one sector with arcs. In the middle part of the disc, considered radially, the three black sectors are followed by one white sector, two sectors with arcs and another white sector. In the inner part of the disc, the three black sectors are followed by one sector with arcs and three white sectors. Rotating the disc in a clockwise direction gives the impression of three concentric halves as seen in Figure 5. The outer one is red, the middle one is green and the innermost one is blue. Reversing the direction of rotation changes the order of the subjectively seen colours in the halves into blue, green and red (considered from outside to inside) as seen in Figure 6.

Many variations of the angles of the disc sectors are possible. The use of intense light and high contrasts without shaded sectors, i. e. a disc having white and black sectors only, will also give a subjective impression of colour.

The facts about these observations, supra, brought the inventors to the conclusion that universally every rhythmic succession of gradations of contrast temporally as well as spatially and also both together, e. g. black and white contrasts, give a colour impression in the human eye. The psychophysical foundations of these phenomena are not yet entirely clear. They must be based upon transmission of colour impressions by the optical nerve to the brain in specially formed impulse-codes. It should be possible to imitate these codes by corresponding artificially produced successions of impulses for each colour. Particularly it may be supposed that any sudden change of brightness releases an electrical impulse in the human eye. Consequently any unsteady rhythmical changes in brightness generate groups of impulses. They may correspond to groups of impulses of physiological colour-codes by putting them together suitably according to those groups. When using relative small maximum contrast between light and dark, it is not only necessary to keep a certain succession of these light-dark contrasts, but there must be also a geometrical side by side contrast of light and dark for a part of one full period. The reason why this is so is not entirely clear. There might be a possible adaption of the eye taking place. The invention however can be explained without any need to account for the psychological and physiological reasons causing these phenomena.

Considering the explanations given above, the basis of the invention consists in the application of the possibility to produce subjective impressions of colour by light and dark contrasts. According to the invention, in a method of producing subjective colour impressions for television, each picture element which is to appear coloured is transmitted with such a rhythmical sequence of light-dark contrasts as to produce subjectively in the human eye the appropriate corresponding colour impressions by the Fechner-Benham phenomenon. Preferably the rhythmical sequence is a temporal and spatial sequence.

It is possible in this way to produce on the screen of a normal television set, that is to say, a set designed for black and white pictures only, colour effects without any changes of the receiver and with relatively little effort in the television studios only. This surprising result is easy to understand, if one imagines that any of the discs which are shown in Figures 1 to 4 are rotated in front of a television camera. They will produce, in the picture which the camera takes of them, a rhythmical succession temporally and spatially of light and dark contrasts. The usual television system transmits 50 pictures a second. The rotating disc should be televised in such a way that, for every picture taken by the camera, the disc has turned on one seventh of a revolution, that is, the angle of one sector. For this, the disc must rotate at a little more than seven revolutions per second. At this speed, the Fechner-Benham colours are very clearly perceived. It is found that such a rotating disc shows the subjective colours not only when it is directly observed but also after the light and dark contrasts have been transmitted by television and reproduced on a television receiver. It is not necessary to use a disc of seven sectors as described for producing colours. One gets also subjective colours using discs divided into a different number of sectors. In principle it is only necessary that there must be produced a certain temporal succession of light and dark contrasts. It is however generally necessary to consider the relatively small maximum contrasts which can be obtained from a television screen and use both a temporal and a spatial succession of light-dark contrasts. A temporal and spatial succession is to be understood so that each particular element of the picture is, in the appropriate sequence, dark (i. e. black) light (i. e. white) and partly light and dark (i. e. black lines on a white background or any other pattern). In other words, by temporal is meant that the light-dark contrasts appear for a predetermined period of time while spatial refers to the particular area in which the light-dark contrasts are permitted to take place. The rhythm and the order of the various presentations depends on the colour wanted. It is easily found out by experiment for any given colour. The experiment with model discs as shown in Figures 1 to 3 demonstrates, for an example, that for a rhythm of about 3 to 10 cycles per second, the succession of black, any pattern (in white on black) and white in a temporal proportion of about 3:1:3 is perceived as an impression of red. A succession of black, white, "pattern" and white of a temporal proportion of 3:1:2:1 is perceived as an impression of green. A succession of black, white and "pattern" in temporal proportion of 3:3:1 is perceived as an impression of blue. In a similar way can other colours also be produced by light-dark contrasts.

This process may be used for the additive mixing of colours as well, so that according to a further feature of the invention subjective mixed colour impressions are produced by a simultaneous or periodical production of at least two overlapping subjective impressions of colours. By the use of three or more different subjective colours, suitably chosen, any required colour may be produced. The single colours are preferably evenly distributed in the colour circle. It is thus possible to reproduce a colour picture by subjective colours, generating the colour-components obtained by analysis of the coloured picture as periodical fluctuating component pictures of subjective red, green and blue.

While it can be seen from the above that the Fechner-Benham discs may be televised producing color when the discs are rotated at a certain speed, the present invention is concerned with producing colored pictures rather than using discs by utilizing the Fechner-Benham effect. These colored pictures may encompass the entire picture or just a portion thereof. They may be one color or composed of a number of colors. In order to carry out the objects of the invention, the colored pictures are produced from so-called black and white motion picture film which may be televised or projected in the conventional manner.

Figure 7:
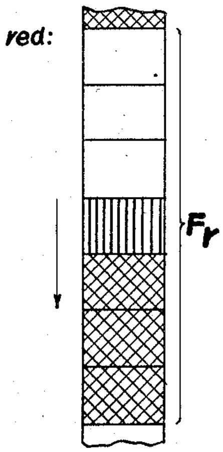
Figures 7, 8 and 9 show parts of film strips which may be used to give subjective impressions of single colours.
Figure 8:
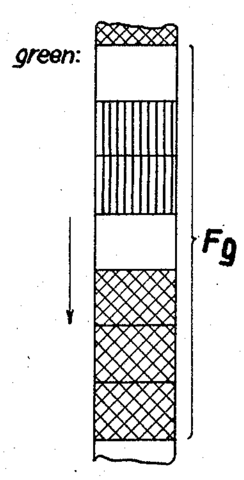
Figure 9:
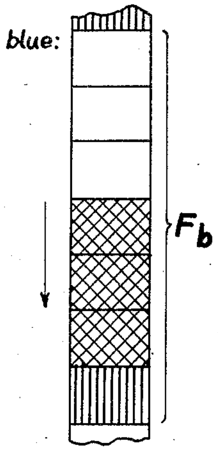

There will now be considered a simple case in which it is required that the whole screen of a television receiver should subjectively appear to be red. For this purpose, a film is televised by a film scanner at the studio with 50 pictures per second, the scanner working discontinuously or continuously. This film is arranged to show (following the arrangement on the disc shown in Figure 1) a recurring sequence of seven film frames having the same picture with different light-dark contrasts. The first three are black, the next one is shaded (or with any other pattern) and the last three are transparent. Such sequences of film pictures which would produce a succession of temporal and spatial light, dark contrasts will be called contrast-picture-series in the following description. By means of a film scanner, the particular contrast-picture-series $F_r$ shown in Figure 7 may be televised and there is perceived on the screen red in the dark parts of the pattern, because of the Fechner-Benham phenomenon. The red occurs as a series of substantially parallel bars or lines. The finer the pattern represented by the bars of the shaded area the more uniform is the distribution of colour over the screen. The periodical contrast-picture-series $F_g$ and $F_b$ shown in Figures 8 and 9 produce in a similar manner subjective colour impressions of green and blue.

Figure 10:
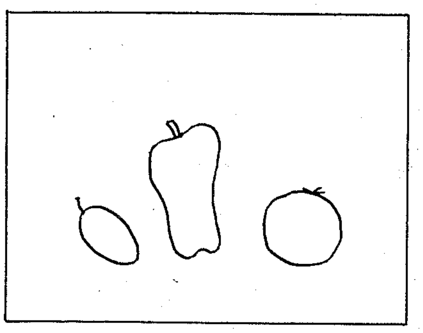
Figure 10 is a diagram representing a picture to be transmitted.
Figure 11:
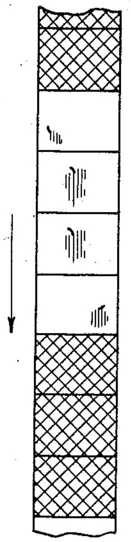
Figures 11 to 14 show diagrammatically parts of film strips for giving subjective impressions of multi-coloured pictures.

For producing cartoons which should appear on the television screen as multi coloured, every picture element is drawn on each film picture in the contrasts needed to generate at the performance a subjective colour impression according to the colours wanted. This will be quite understandable from the explanations of the idea given before. If there should be televised for example a green pepper, a red tomato and blue plum as shown in Figure 10, then a film may be prepared as shown in Figure 11. The film pictures show, after the three black frames, the objects shaded or white (transparent) according to their colour. The green pepper is shown in a sequence of seven frames as being black in the first three, transparent in the next frame, patterned by lines in the next two frames and transparent in the last frame. The red tomato is shown in a sequence of seven frames as being black in the first three, patterned by lines in the next, and transparent in the last three. Finally, the blue plum is shown in a sequence of seven frames as being black in the first three, transparent in the next three, and patterned in the last. It is pointed out that the sequence of seven frames is repeated on the film so that a continuous colored picture of the three items may be projected or televised.

It will be noted that the shaded patterns are drawn as vertical lines. In such an instance the colored area will appear as vertical colored bars. When horizontal lines are employed, the colored area will be in the form of horizontal colored bars. The bars need not be vertical or horizontal but may be diagonally positioned. Furthermore, the bars may be straight or convoluting as desired. As stated in the above, the finer the vertical lines of the shaded portion, the more uniform is the distribution of the color within the area being colored. The minimum thickness depends upon the resolution of the television screen or projection screen. In connection with television, it is well known that the resolution in a horizontal line can be greater than the resolution vertically. In other words, the resolution horizontally would depend upon the transmitting megacycles while vertically on the number of lines transmitted by the particular television system. The size of colored bars vertically on a 21-inch screen of present production would be about 3 mm. and the space therebetween would be about 5 mm.

Figure 12:
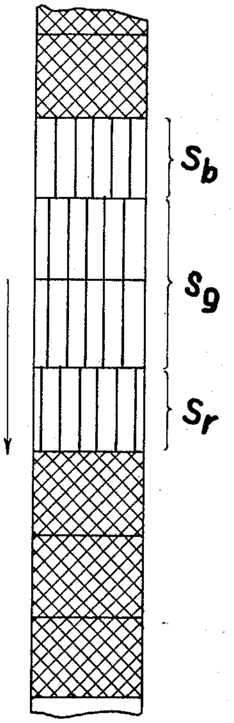

To reproduce mixed (combination) colours containing red as well as green components, the lines $S_r$, $S_g$ and $S_b$ (Figure 12) which correspond to the single colour components have to be displaced not only longitudinally into different frames but also laterally. This is to avoid the lines interfering with one another in producing the required subjective impressions. In Figure 12 all the film picture is shaded or blackened to explain this arrangement, the lines being widely spaced apart to show their arrangement clearly. It will be understood that if only one spot in the picture should appear coloured, then only the appropriate part would have the dark, light-dark, and white contrasts.

Figure 13:
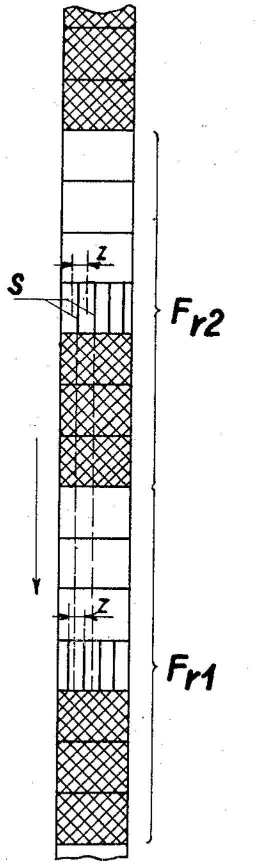
Figure 14:
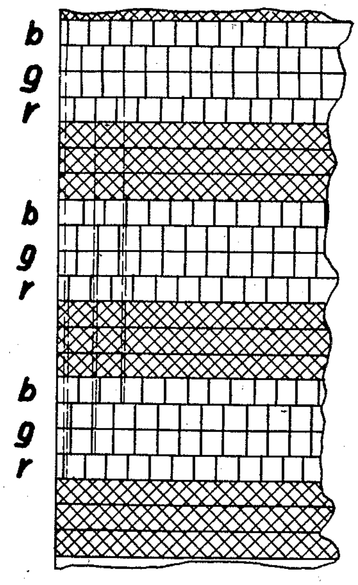

An intensive impression of colour is obtained on the lines of the shading by use of relative thick lines (i. e. a coarse pattern) but in that case, one can see the uncoloured (white) space between the coloured lines. However, if the lines corresponding to one colour are displaced laterally in consecutive contrast-picture-series so as to appear in one series in what was formerly the space between them, the colouring of the whole area becomes almost uniform. This principle is shown in Figure 13 for the simple case of a mono-chromatic red screen. The colour-picture-series $F_{r1}$ corresponds to the pattern in Figure 7. In the next colour-picture-series $F_{r2}$ the lines S are displaced laterally. They are now in the position of the spaces Z of the former pattern. Since the effect of the impression lasts for some time, these lines together form an almost uniform red pattern. Figure 14 shows schematically a consequent development of this method for reproduction of a multi-coloured picture. The film in Figure 14 is very much enlarged laterally in order to show this method of preparation.

For graduation in brightness of the colours a graduation of the light-dark contrasts can be used. For example black-white into grey-white or black-grey or dark grey or light grey. In other words, the higher the contrast between the black areas and the white areas, the greater is the brilliance of the colors produced. Therefore, by employing a white surface or a black surface or bars having a lower contrast ratio, shades of the color could very well be produced.

Reproduction of natural pictures may be obtained by a mask and filter disc rotating in front of the cinematograph or television camera. The natural colours of the picture are divided in their single-colour components in the known way and consecutively taken and made into contrast-picture-series as in Figures 11 and 12. In other words three consecutive pictures are entirely blackened if the next picture is taken with a red filter to produce a pattern showing the red colour content, the next two pictures similar but showing the green colour content and finally one is taken with a blue filter to produce a pattern showing the content of blue colour. This method can obviously be applied also for transmitting coloured cinematograph films. It is also possible to generate this pattern electronically from the studio by controlled switching of the cathode ray beam of the picture tubes at the receiver as well as to obtain each single-colour picture from a number of picture tubes provided with filters.

Owing to the lines or any pattern in the contrast-picture series, which are necessary in the above described applications of the invention there is a loss in the resolution compared with a black and white television system. This would necessitate in general an increase of transmitted picture elements. The method of the invention can immediately be applied to those purposes which do not need a high definition and also do not require a very exact colour reproduction such as cartoons, reproductions of sketches, advertising films, coloured writing, trademarks, interlude pictures and similar presentations. Pictures of this kind could be reproduced at once or after making only a small addition of equipment in the studio according to the system explained above. They could be seen subjectively coloured on existing television sets.

The invention includes within its scope not only the method of producing subjective colour impressions for television but also the apparatus for carrying out this method. In particular the invention includes within its scope a film in which each picture element which is to be reproduced in colour is made, in pictures following one another, dark, shaded and light in a manner according to the colour impression required. As described above, three black picture fields may be followed by four patterned picture fields, which patterned fields are longitudinally and laterally displaced with respect to one another on the film, one of the patterned fields corresponding to the red content of the required picture, two corresponding to the green content and the fourth to the blue content.

We claim as our invention:

1. A cinematographic film for transmission of colored pictures by a television system wherein one frame of the film is transmitted in each scanning period, said film comprising frames in which each picture element of the frames which is to appear colored on the screen of a television set for black and white transmission is recorded on the film within subsequent frames of a periodically recurring series of frames in a permutation of light, dark and light-dark contrasts, so as to produce by intermittent excitation of the human eye the desired subjective color impression in accordance with the Fechner-Benham phenomenon.

2. A film as claimed in claim 1, wherein said light-dark contrasts are produced by a regular pattern.

3. A film as claimed in claim 2, wherein said regular pattern is formed by hatchings.

4. A film as claimed in claim 2, wherein said regular pattern is formed by cross-shadings.

5. A film as claimed in claim 1, wherein said light-dark contrasts are graduated in subsequent frames.

6. A cinematographic film for transmission of colored pictures by a television system, wherein one frame of the film is transmitted in each scanning period, said film comprising frames in which each picture element of the frames which is to appear subjectively red on the screen of a television set for black and white transmission the corresponding picture elements are recorded on the film within a periodically recurring series of frames on frames following one another, in dark, then in light-dark contrasts and then in light, said light-dark contrasts being produced by a regular pattern.

7. A cinematographic film for transmission of colored pictures by a television system, wherein one frame of the film is transmitted in each scanning period, said film comprising frames in which each picture element of the frames which is to appear subjectively green on the screen of a television set for black and white transmission the corresponding picture elements are recorded on the film within a periodically recurring series of frames on frames following one another, in dark, in light, in light-dark contrasts and then in light, said light-dark contrasts being produced by a regular pattern.

8. A cinematographic film for transmission of colored pictures by a television system, wherein one frame of the film is transmitted in each scanning period, said film comprising frames in which each picture element of the frames which is to appear subjectively blue on the screen of a television set for black and white transmission the corresponding picture elements are recorded on the film within a periodically recurring series of frames on frames following one another, in dark, in light and then in light-dark contrasts, said light-dark contrasts being produced by a regular pattern.

9. A cinematographic film for transmission of colored pictures by a television system, wherein one frame of the film is transmitted in each scanning period, said film comprising a periodically recurring series of seven frames on which each picture element of the frames which is to appear colored on the screen of a television set for black and white transmission is recorded on the film within subsequent frames on three frames in dark and on the following four frames patterned by hatchings, said hatchings corresponding to the various picture elements and being displaced laterally and longitudinally one against the other on the film, one hatching corresponding to the red content, two hatchings corresponding to the green content and one hatching corresponding to the blue content, so as to produce by intermittent excitation of the human eye the desired color impression subjectively in accordance to the Fechner-Benham phenomenon.

10. A method of producing subjective color impressions in images on the screen of a black-and-white television receiver, which method comprises transmitting signals for successive picture frames in which each picture element which is to appear colored is represented in successive frames of a periodically recurring series of frames in a permutation of light, light-dark contrasts and dark so as to produce by intermittent excitation of the human eye subjective color impressions in accordance with the Fechner-Benham phenomenon.

11. For use in a black-and-white television system, a cinematograph film comprising frames in which each picture element of the frames which is to appear colored on the screen of a television receiver is recorded on the film in successive frames of a periodically recurring series of successive frames in a permutation of light, light-dark contrasts, and dark so as to produce by intermittent excitation of the human eye subjective color impressions in accordance with the Fechner-Benham phenomenon.

12. For use in a black-and-white television system, a cinematograph film comprising frames in which each picture element of the frames which is to appear colored on the screen of a television receiver is recorded on the film in successive frames of a periodically recurring series of successive frames in one of a number of different permutations of light, light-dark contrasts and dark, which different permutations are employed for different picture elements according to the subjective color impression to be produced by intermittent excitation of the human eye in accordance with the Fechner-Benham phenomenon.

13. A cinematograph film as claimed in claim 12 wherein the film comprises frames in which each picture element to appear subjectively red is recorded in frames following one another in a periodically recurring sequence in dark, then in light-dark contrasts and then in light, each picture element to appear subjectively green is recorded in frames following one another in a periodically recurring sequence in dark, then in light, then in light-dark contrasts and then in light and each picture element to appear subjectively blue is recorded in frames following one another in a periodically recurring sequence in dark, then in light and then in light-dark contrasts.

14. In a television system wherein one frame of a film to be televised is transmitted in each scanning period, a black-and-white film comprising periodic series of frames in which each image area which is to be seen in certain color by the viewer of the screen of a television receiver is recorded on successive frames of the series in an appropriate sequence of light, light-dark, and dark contrasts so that the successive display of the frames on the receiver screen produce subjectively by correspondingly successive intermittent excitation of the viewer's eye the desired color impressions by the Fechner-Benham effects.

15. A method of producing color impressions in images on screens by projecting successive picture frames of motion picture film in which a picture element which is to appear colored is represented in groups of successive frames as substantially transparent in some frames, as substantially opaque in other frames, and having a pattern of substantially opaque lines with transparent areas therebetween in still other frames, whereby to produce by intermittent excitation of the human eye color impressions consisting of colored spaced bars.

16. A method of producing color impressions in images on the screen of a black-and-white television receiver, which method comprises transmitting signals for successive picture frames in which a picture element which is to appear colored is represented in groups of successive frames, as substantially transparent in some frames, as substantially opaque in other frames, and having a pattern of substantially opaque lines with transparent areas therebetween in still other frames, whereby to produce by intermittent excitation of human eye color impressions consisting of colored spaced bars.

References Cited in the file of this patent

UNITED STATES PATENTS

| | | |
|---|---|---|
| 1,322,794 | Kelley | Nov. 25, 1919 |
| 1,937,823 | Kelley | Dec. 5, 1933 |

OTHER REFERENCES

"Color and Its Applications," Luckiesh, Text book published by Van Nostrand Co., New York, 1915, pages 39–41 cited.

"Physiological Optics," Helmholtz, vol. II, U. S. Edition published by the Optical Society of America, 1924, pp. 255–257 cited.

"The Science of Color," Committee on Colorimetry, Text book published by Crowell Co., New York, New York, 1953, page 109 cited.